Dec. 27, 1932. G. HUHN 1,892,574
PLUG COCK
Filed March 30, 1931
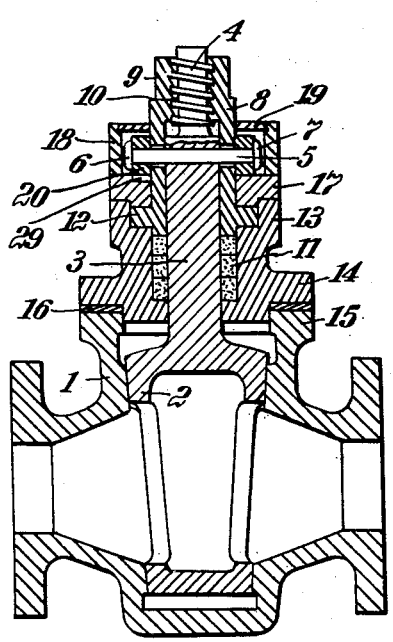
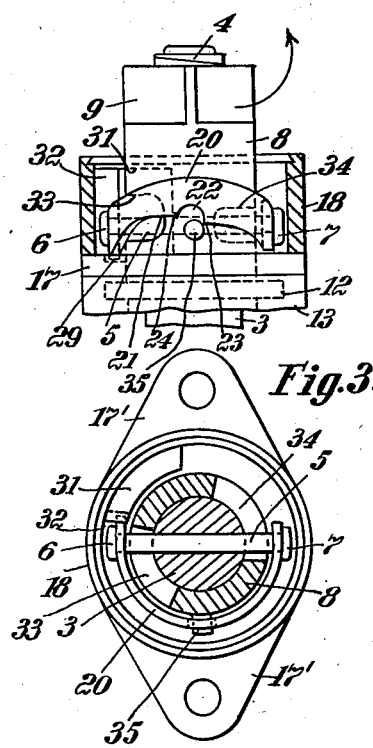
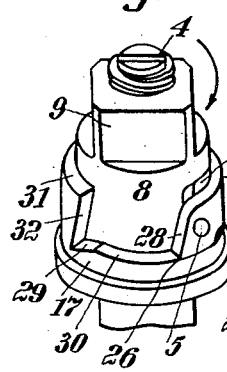
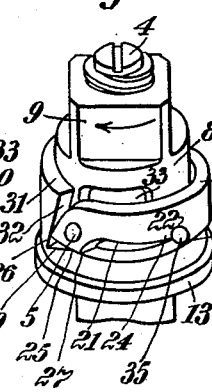
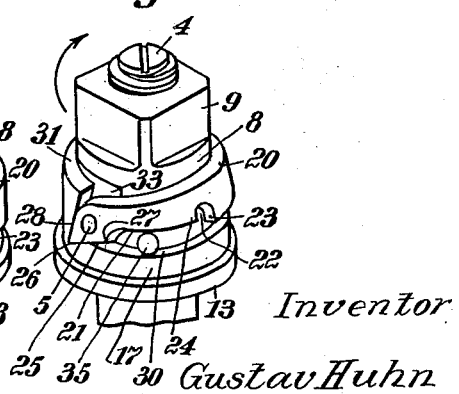
Inventor
Gustav Huhn
By H. B. Willson & Co
Attorneys Patented Dec. 27, 1932

1,892,574

UNITED STATES PATENT OFFICE

GUSTAV HUHN, OF BERLIN, GERMANY

PLUG COCK

Application filed March 30, 1931, Serial No. 526,463, and in Germany October 15, 1930.

The invention relates to a plug cock, the plug of which, preferably conical; is lifted off its seat in the box prior to the opening movement by turning a threaded ring connected with the plug shaft by means of a screw connection and, after terminating the closing movement, is pressed into the seat. Cocks of this kind are known, in which the threaded ring screwed on to the plug shaft is coupled with the latter by initiating a correspondingly long idle motion, so that in connection with one part of the rotation of the ring in either direction the plug, being prevented from participating in the turning movement by the casing friction, is moved only axially, and only after the engagement of the coupling it is taken along positively as the ring continues to turn. This arrangement is disadvantageous in that, if the amount of friction of the cock plug within the box is less than the amount of friction of the thread between threaded ring and cock plug, there will occur during the axial movement, a rotary movement of the plug shaft so that the plug will be raised and lowered in undesirable intermediate positions.

In accordance with the present invention this disadvantage is obviatel, inasmuch as during the axial movement, when the coupling between plug shaft and threaded ring is disengaged, the plug shaft is positively locked so as to be prevented from describing a turning movement. Preferably the coupling member proper is designed like a bolt which, in the uncoupled position positively locks the plug shaft thus preventing it from rotating. For this purpose the coupling member may be made to consist of a swivelling lever, the pivot of which is furnished by the fastening pin for the plug shaft and the long arm of which engages a pin attached to the threaded ring by means of a notch when in the coupling position, whilst the shorter arm forms an oblique point, which for the purpose of uncoupling is made to rest against an oblique wall and, gliding along the latter, is introduced into a bolt notch also oblique in accordance therewith. In connection herewith the notch receiving the pin rotated together with the threaded ring, may form a rest, whereby the partaking movement of the coupling lever in connection with the rotation of the threaded ring is initiated, ensuring the uncoupling and simultaneously the swinging movement of the lever into the coupling position.

In the accompanying drawing an advantageous form of construction for accomplishing the object of the invention has been represented.

Figure 1 shows the cock in vertical section.
Figure 2 represents an enlarged part view with open box.
Figure 3 is a cross sectional view.
Figures 4, 5 and 6 are schematical perspective views of the upper part, with external casing removed, showing the parts in different positions.

The conical cock plug 2 is rotatably deposited in the box or casing 1. The plug or stem shaft 3 is provided at the upper end with male thread 4, in which the female thread 10 of a threaded ring 8 is engaging, the latter being provided at the upper end with a square 9 intended for the reception of the cock key or handle. The threaded ring 8 is provided with a flange 12 located between the box part 13 and an annular cover 17, thereby preventing an axial displacement of the threaded ring 8 on being turned. The threaded ring 8 also serves as cover for a stuffing box with packing rings 11. The box parts 1 and 13 are connected by their flanges 14 and 15 between which is the usual washer 16. Below the thread 4 the plug shaft is provided with a drilled opening to receive a pin the ends of which pin serve as fastening points and pivots of a stirrup-shaped lever 20. The ends of the pin 5 are provided with heads 6 and 7. For the purpose of permitting the ring 8 to turn on the shaft or stem 3 said ring 8 is provided with segmental notches 33, 34 which are diametrically opposed and receive the ends of pin 5 as shown in Fig. 3. A ring 18 with detachable cover 19 closes the box in an upward direction. This ring 18 also is equipped with flanges 17' that are connected with the flanges of the part 17 and by means of screw bolts. Furthermore on the threaded ring 8 is a pin 35 which projects below the stirrup 20. The under edge of the stirrup is provided with a notch 22 intended to receive the pin 35, when the latter is immediately below the notch. This under edge of the stirrup 20 forms a gliding surface 21 for the pin and it rises from left to right terminating at 24 in the notch 22. On the other side of the notch the wall 23 projects a trifle in a downward direction, thus forming a stop for the pin 35. Below the pivot 5 the stirrup 20 has been somewhat widened, forming an oblique surface 25 which merges at 27 into the gliding surface 21. On the other side the oblique surface 25 terminates in a point 26 projecting towards the left in front of the pivot 5 of the stirrup and this projecting part represents the short arm of a two-armed lever, the longer arm of which is formed by the remaining portion of the stirrup 20. Also the front edge 28 of this projecting part of the stirrup 20 forms an oblique surface. The ring 17 carries a segmentlike projection 31, with which, as it has been assumed in Figs. 4-6, it may form a whole. This projection, the height of which is slightly in excess of that of the stirrup 20, forms an oblique face 32, the slant of which corresponds to the bevel 28 on the short arm of the stirrup 20. The ring 17 possesses a horizontal upper edge 30, along which the pin 35 and the lower edge 25 of the stirrup 20 are made to glide. This horizontal gliding surface 30 terminates in an oblique hollow or depression 29, so that between the face 32 and the oblique surface 29 a pointed bolt catch is formed corresponding to the cross sectional form of the pointed head of the stirrup 20.

The operation of the cock may be gathered from Figs. 4, 5 and 6.

Fig. 4 shows the cock in the open position with raised plug, Fig. 5 in the closed position with raised plug and Fig. 6 illustrates the closed position with the plug pressed into its seat. In the position according to Fig. 4 the pin 35 engages the notch 22 of the stirrup 20. If the threaded ring 8 is turned in the direction of the arrow, the pin 35 connected with it takes the stirrup 20 along with it and also, by means of the cross pin 5, it moves the plug shaft 3 and the plug 2, so that the cock, previously opened, is made to occupy the closed position. At this moment the position according to Fig. 5 has been attained, where the point 26 of the stirrup 20 establishes contact with the oblique gliding surface 32. By continuing the rotation of the threaded ring 8 in the direction of the arrow, the stirrup 20 is now swung round its pivot 5, because the oblique point 26 is being guided into the oblique hollow or notch 29 of the ring 17. The stirrup is thus moved to its raised position, in which the notch 22 is removed from the pin 35, whilst the latter, as a result of the further rotation of the threaded ring 8 is free to pass on until reaching the position in accordance with Fig. 6 where the plug is completely pressed into its seat. In connection with the displacement of the pin 35 from the position according to Fig. 5 to the position according to Fig. 6, the threaded ring 8 is merely screwed onto the thread 4 of the plug shaft 3, without any possibility for the plug shaft participating in this turning movement, because the contact of the point 26 with the wall 32 prevents any further rotation of the stirrup 20 and hence the cross pin 5 and the plug shaft 3.

If now the cock is to be opened again, the threaded ring 8 is turned in a direction opposite to that indicated by the arrow in Fig. 6. In such operation the pin 35 is made, in the first instance, to pass along the gliding surface 30 towards the right until attaining the position according to Fig. 5, without taking along the stirrup 20 and with it the cock plug, because the short arm of the stirrup 20 catching with its point in the bolt catch or notch 29, allows of a movement along the upwards slanting surface of the hollow notch 29 only in conjunction with a simultaneous swinging of the stirrup 20, such swinging movement, however, being prevented by the pin 35 situated below the former. Only when the pin 35 arrives below the notch 22, will a swinging of the stirrup 20 be possible and this takes place as soon as the pin 35, in conjunction with a further rotation of the threaded ring 8 in a direction opposite to that indicated by the arrow, strikes the projecting wall 23 of the notch 22 of the stirrup. This causes the point 26 of the stirrup to be withdrawn from the bolt catch or notch 29 and simultaneously swung thereby round the middle of the oblique edge 25, causing the pin 35 to catch in the notch 22 and the position according to Fig. 5 to be attained. Until this position has been attained the rotation of the threaded ring 8 merely causes an axial lift of the cock plug without rotation.

In the position according to Fig. 5 the threaded ring 8 is coupled with the cock plug 2 by means of the stirrup 20, so that by a further rotation opposite to the direction indicated by the arrow the cock, entirely closed so far, will be opened, and the position is attained as shown in Fig. 4, where the plug is opened and lifted off its seat.

Having now particularly described and ascertained the nature of my said invention, I declare that what I claim is:

1. In a plug cock comprising a casing, a turn-plug fitted therein and having a threaded stem, a handle-carrying ring threaded to engage the threads on said stem, and a coupling member for coupling said ring with the plug stem, the plug being adapted to be lifted off and pressed into its seat in the casing axially by turning the threaded ring, the coupling member consisting of a two-armed lever pivotally connected with the plug stem the longer arm of which has a notch, a pin in the threaded ring engaging into said notch in the coupling position, the shorter arm of said lever forming an oblique point, the latter being guided and stopped by an oblique sliding face and an oblique recess formed on said casing.

2. In a plug cock comprising a casing, a turn-plug fitted therein and having a threaded stem, a handle-carrying ring threaded to engage the threads on said stem, a coupling member for coupling said ring with the plug-stem, the plug being adapted to be axially lifted off and pressed into its seat in the casing by turning the threaded ring, the threaded ring being formed with segmental notches, a cross pin passing through the plug-stem and having its ends extended into said segmental notches, a two-armed stirrup-shaped lever pivoted on the ends of said cross pin, the longer arm of said lever having a recess, a pin in the threaded ring engaging said recess, the shorter arm of the lever forming an oblique point, an oblique fixed wall guiding said point and forming a catch for stopping said point in the uncoupled position during the axial movement of the plug.

3. In a plug cock comprising a casing, a turn-plug fitted therein and having a threaded stem, a handle-carrying ring threaded to engage the threads on said stem, a coupling member for coupling said ring with the plug-stem, the plug being adapted to be axially lifted off and pressed into its seat in the casing by turning the threaded ring, the threaded ring being formed with segmental notches, a cross pin passing through the plug-stem and having its ends extended into said segmental notches, a two-armed stirrup-shaped lever pivoted on the ends of said cross pin, the longer arm of said lever having a recess, a pin in the threaded ring engaging said recess, the shorter arm of the lever forming an oblique point, an oblique fixed wall guiding said point and forming a catch for stopping said point in the uncoupled position during the axial movement of the plug, the said recess in the longer arm of the stirrup-shaped lever having an extended wall, this extension forming an abutment for the pin attached to the threaded ring, whereby the uncoupling of the lever in connection with the rotary movement of the threaded ring is initiated.

In testimony whereof I have hereunto set my hand.

GUSTAV HUHN.